April 7, 1936.  W. NOWKA  2,036,881
VARIABLE SPEED TRANSMISSION
Filed March 18, 1933     3 Sheets-Sheet 3
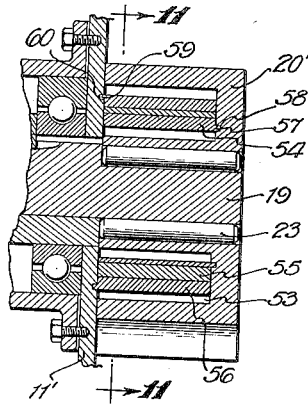
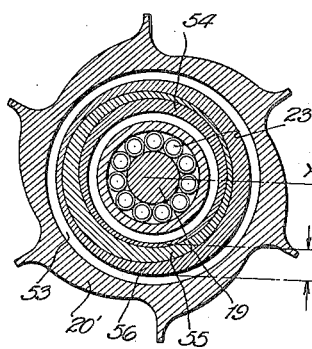
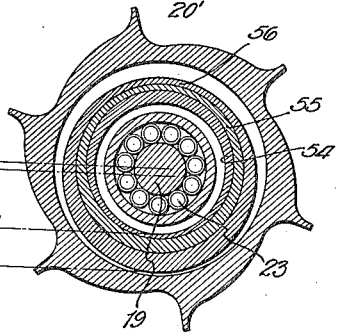
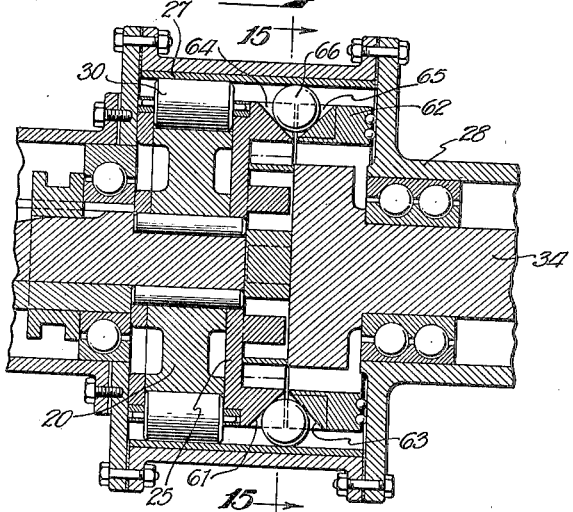
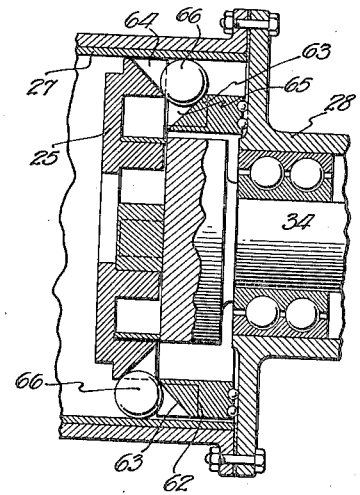
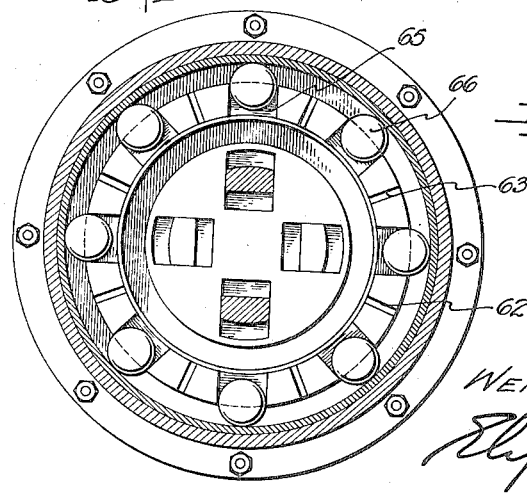
INVENTOR
WERNER NOWKA.
BY
ATTORNEYS Patented Apr. 7, 1936

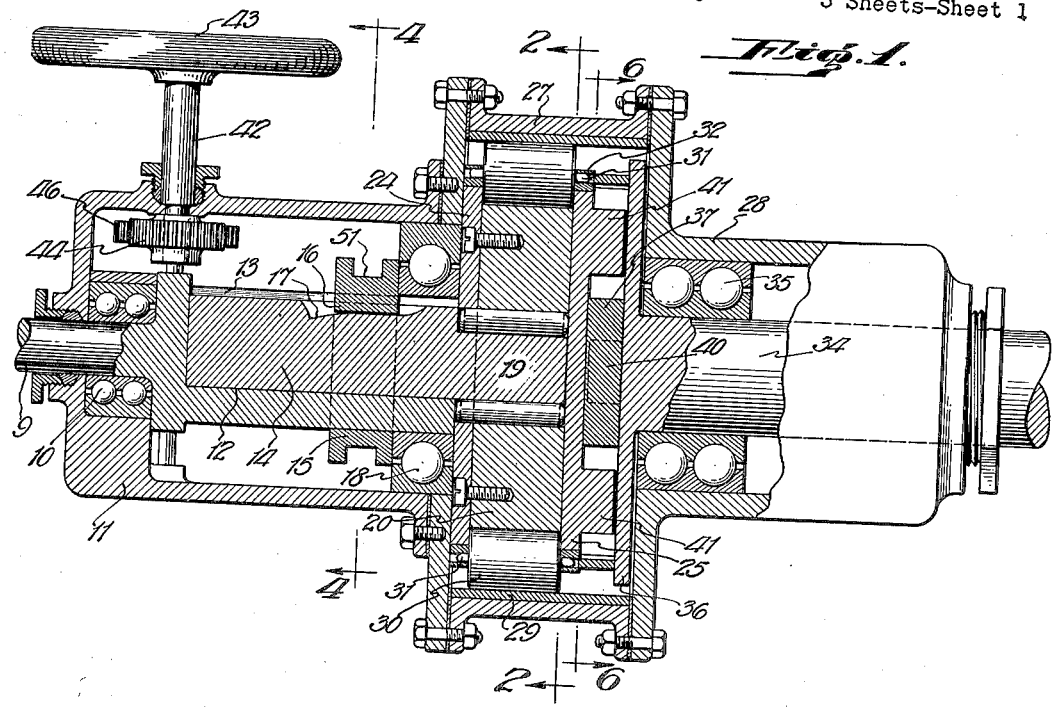

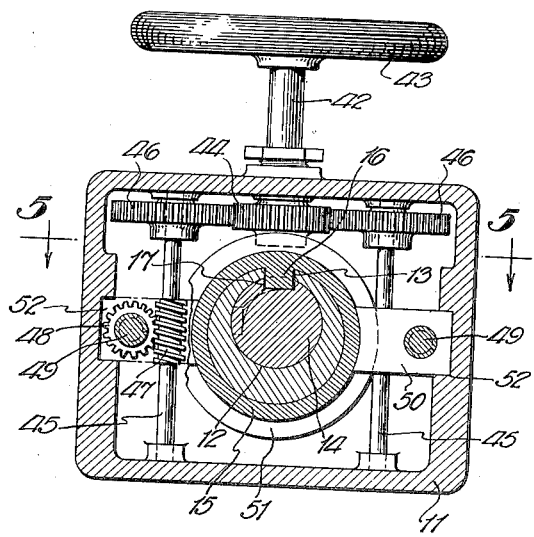
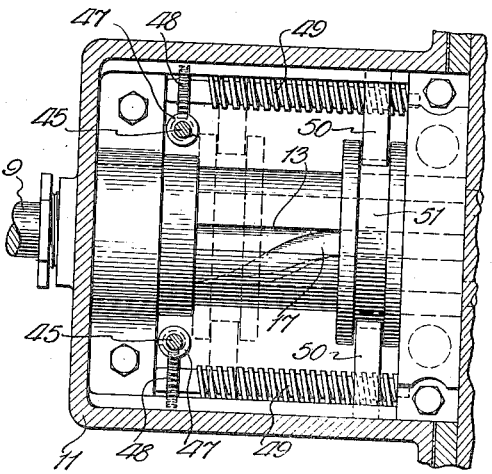
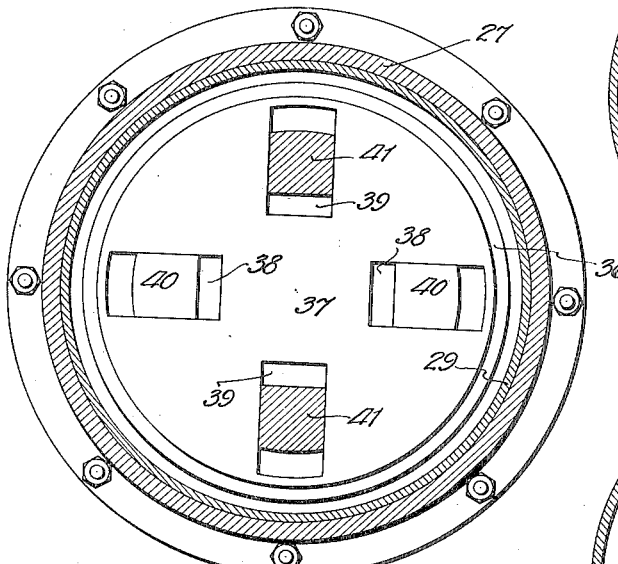
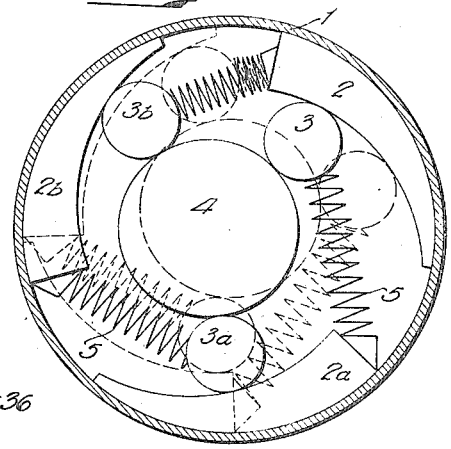
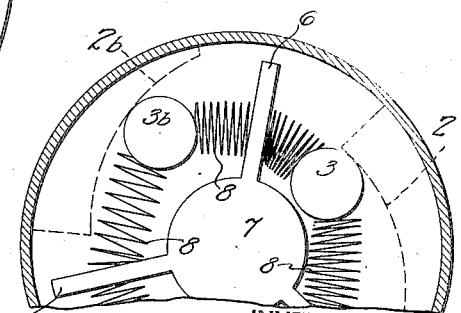

2,036,881

UNITED STATES PATENT OFFICE 2,036,881

VARIABLE SPEED TRANSMISSION

Werner Nowka, Pawtucket, R. I., assignor, by mesne assignments, to Paul Kollsman, Brooklyn, N. Y.

Application March 18, 1933, Serial No. 661,430

7 Claims. (Cl. 74—117)

This invention relates to improvements in power transmissions and more particularly to variable speed transmissions.

The primary object of the invention resides in a mechanical power transmission having an infinite variation of speed from zero up to, and, if and when desired, even beyond the speed of a drive shaft rotating at a constant speed.

While the basic principle involved in this invention is variable eccentricity as disclosed in my co-pending application for Letters Patent, Serial No. 439,987, filed March 29, 1930, it has now been possible to so far transcend the scope of the former invention, that certain radically new, basic principles have been established, as will appear from the following:

First, it becomes possible to employ an eccentric mounted on a drive shaft to rotate a driven member directly connected thereto, and thus eliminate all intermediate motion transmitting elements, and secondly, these new principles offer construction possibilities, wherein the fluctuation due to gyratory or oscillating motion of the driving eccentric can be equalized.

With these and other objects in view, the invention resides in the novel construction, combination, and arrangement of parts, the essential features of which are more fully described in the specification, are fully set forth in the appended claims, and are illustrated in the accompanying drawings, in which:

Figure 1 is a vertical longitudinal sectional view of the invention.

Figure 2 is a vertical transverse sectional view on the line 2—2 of Figure 1.

Figure 3 is a detail perspective view of the eccentric drive shaft.

Figure 4 is a vertical transverse sectional view on the line 4—4 of Figure 1.

Figure 5 is a horizontal sectional view on the line 5—5 of Figure 4.

Figure 6 is a vertical transverse sectional view on the line 6—6 of Figure 1.

Figures 7 and 8 are diagrammatic cross sectional views showing the simplest form of the principle of the invention.

Figure 9 is a detail diagrammatic view illustrating the underlying principle of the curve-design for the adjustment of fluctuation.

Figure 10 is a detail vertical sectional view illustrating one form of balancing the eccentric showing the parts in neutral position.

Figure 11 is a vertical transverse sectional view on the line 11—11 of Figure 10.

Figure 12 is a view similar to Figure 11 showing the parts in eccentric position.

Figure 13 is a detail vertical sectional view through a modification of balancing the eccentric showing the parts in neutral position.

Figure 14 is a view similar to Figure 13, but showing the parts in eccentric position.

Figure 15 is a vertical transverse sectional view on the line 15—15 of Figure 13.

For the sake of clearness, it is believed that the principle of the invention is best seen in Figures 7 and 8 of the drawings, and a description of this simple form will be proceeded with at this time. Referring to these figures, the numeral 1 designates a ring of annular casing while fitting against the inner periphery of the ring are spaced segmental shaped inclined plane members, 2, 2a, and 2b. The bases of the members rest against the inner side of the ring and the rise of the same does not exceed the angle of repose, that is, any tendency of the inclined plane or wedge members to slide backward along the ring under any pressure exerted upon the inclined surface, must be completely absorbed by the angle of friction between these surfaces. In the present instance, three inclined surfaces are shown but any desirable number may be provided that will produce the desired result hereinafter explained.

Rollers 3, 3a, and 3b, respectively, engage the inclined faces of the members 2, 2a, and 2b, and are held thereagainst by another surface which is in the form of an eccentric 4 fixedly mounted on a roller drive shaft. The eccentric 4 constitutes a rotatable driving element which revolves about a center of rotation concentric with the outer ring 1, and it is evident that the radial distance between the surface of the eccentric and the ring, or any point on the inclined planes becomes smaller, a corresponding pressure is exerted upon the rollers 3, 3a, and 3b, and the latter are adapted to successively roll down along the respective inclined planes a distance corresponding to the rise of the eccentric.

For example, the roller 3 in Figure 7 during a quarter revolution of the eccentric has rolled down the inclined plane 2 from the full line position to the advanced position shown in dotted lines, or a distance equivalent to the angular displacement between the angles of the inclined plane and that of the eccentric.

It is obvious that the angular displacement above referred to would be greater with an increased, and smaller with a decreased eccentricity, and therefore, if the eccentricity becomes variable, the distance of forward travel of the roller becomes correspondingly variable. This principle could be directly employed to drive a shaft to be driven by transmitting the power from the rollers to such shaft, however, if but one roller and inclined plane were employed, only an intermittent motion would be transmitted to a driven shaft as the eccentric will rise against that plane only during one half revolution of the same, hence the use of two or more rollers and inclined planes as shown. With such an arrangement, one roller is always being rotated forward, whereby a continuous forward rotation is obtained.

Each of the rollers are connected to one end of expansion springs 5, the opposite ends being connected to the hind end of the wedge member of the following roller, thus a spring 5 extends from the roller 3 to plane member 2a, another from roller 3a to plane member 2b, etc.

From the foregoing description taken in conjunction with the full and dotted line positions of the parts shown in Figure 7, it will be seen that during a quarter revolution of the eccentric, the same has not only rotated roller 3 forward, but has also released and become separated from roller 3a. However, the spring 5 between roller 3 and wedge member 2a has immediately expanded accordingly, and with the roller 3 driving from behind, has forced roller 3a forward, keeping it in contact with the surface of the eccentric 4 which is now in position to rotate the roller 3a forward the very instant it releases the roller 3. The rollers 3a and 3b correspondingly operate as the eccentric completes its full revolution.

Having thus obtained a continuous forward rotation by the successive movement of the rollers, the same need only be connected to a shaft to be driven in order to rotate that shaft continuously in a forward direction an angular distance corresponding to the driving eccentricity. This may be accomplished by various means such as a conventional form of clutch arrangement, or a system of springs such as shown in Figure 8 of the drawings. In this construction the rollers 3, 3a and 3b extend beyond the plane of one end of the eccentric 4 and wedge members and are respectively disposed between the radially extending arms 6 carried by a driven shaft 7. Expansion equalizing springs 8 are interposed between opposite sides of the rollers and the adjacent arms 6. Thus it will be seen that, as the rollers are successively moved during rotation of the eccentric 4, the same will impart a corresponding movement to the driven shaft 7 through the rollers 3, 3a, and 3b and springs 8.

Having explained the general principle of the invention as illustrated in the diagrammatic views 7 and 8, a practical application of the same embodying additional features is illustrated in Figures 1 to 6 inclusive. The fundamental principles involved in the form is substantially the same as above described, but the position of the inclined planes and the rollers are reversed, that is, instead of the rollers rolling off the inclined planes, the latter roll off the rollers. Thus power must be taken from the member having the inclined planes for transmission to the shaft to be driven, rather than from the rollers as previously set forth. Briefly, the inclined plane in this form is interposed between the driving eccentric and the roller, the latter being held against an annulus.

In this construction, the numeral 9 designates a rotatable drive shaft having one of its ends journaled in ball bearings 10 mounted in a rectangular shaped housing section 11. The drive shaft extends into the housing section 11 and is formed with an eccentric socket 12, while the wall of the socket is provided with a slot 13, which extends inwardly from the outer open end for a purpose to be presently explained. Fitting into the eccentric socket 12 for turning movement therein is an auxiliary drive shaft 14 keyed to the socketed end of the main drive shaft 9 by a collar 15 slidably mounted on the socket end of the said drive shaft. The collar 15 is provided with a key lug 16 which extends through the slot 13 into a spiral groove 17 formed in the auxiliary shaft 14. The key lug and slot in addition to keying the auxiliary shaft with the main shaft, also serves a purpose to be hereinafter explained. The outer end of the socket is journaled in an anti-friction bearing 18 and projecting beyond the plane of the bearing and formed integral with the auxiliary drive shaft 14 is an eccentric stub shaft 19, the axis of which may be brought into axial alinement with the drive shaft 9 or out of alinement therewith by the turning of the auxiliary shaft 14 relative thereto, whereby to change the eccentricity from zero upwardly. From the description thus far, it will be seen that if the eccentric stub shaft 19 is set in axial alinement with the axis of the shaft 9, as shown in the drawings, the same will turn on the same axis as the drive shaft, but by setting the stub shaft 19 to a position eccentric to the drive shaft, the same will turn in and out with reference to the center of rotation as the shaft 14 is turned about its own center within the eccentric socket 12.

Rotatably mounted upon the eccentric stub shaft 19 is a driven member 20 in the form of a rotor having a series of inclined planes 21 on the periphery thereof, the ends of the inclined planes terminating in outwardly extending stop fingers 22. A roller bearing 23 is interposed between the eccentric shaft 19 and the driven member 20. Bolted or otherwise secured to opposite sides of the member 20 are disk plates 24 and 25, the latter overlying the end of the eccentric shaft 19 and constituting a coupling plate as will be hereinafter explained. The periphery of the disk plates 24 and 25 extend beyond the periphery of the member 20 and are provided with outwardly extending lugs 26.

Enclosing the member 20 and its co-related parts is a cylindrical casing section 27 which is bolted to the casing section 11 and to another casing section 28. The inner peripheral wall of the casing section 27 is provided with a bearing ring 29 and between the bearing ring and the respective inclined surfaces of the member 20, are rollers 30. The rollers are of a width approximating the width of the member 20 and extending axially from opposite ends thereof are pintles 31, which are mounted in floating bearings 32, which slide on the outer curved surfaces of the plates 24 and 25 between the stop lugs 26. Contractile springs 33 have one of their ends connected to a lug 26 and their other ends to the floating bearings 32 to normally urge the rollers in one direction and which permit of the relative sliding movement of the rollers with respect to the member 20 and the plates 24 and 25. These springs act to always hold the periphery of the rollers in bearing contact with the ring 29 and respective inclined planes 21 of the member 20.

Extending into the housing section 28 in one end of a driven shaft 34, the same being rotatably mounted in an anti-friction bearing 35. Although various types of flexible couplings may be employed to connect the driven member 20 with the driven shaft 34, I have illustrated a construction which will serve the purpose and which consists in providing a disk 36 on the inner end of the driven shaft against which a coupling plate 37 fits. The coupling plate is interposed between the disk 36 and plate 25 and is provided with two sets of diametrically opposed slots 38 and 39. Lugs 40 extend from the disk 36 into the slots 38 while similar lugs 41 extend into the slots 39 from the plate 25. The slots are of sufficient length to compensate for the gyratory action of the eccentrically driven member 20 during rotation of the member 20 when in driving operation.

From the description thus far of the form shown in Figures 1 to 6 inclusive, the advantages thereof are apparent. For example, a system of inclined planes, shown in Figure 7 independent of each other, are now combined into one single unit 20, which not only simplifies the construction as well as the operation of the unit, but eliminates all secondary driving elements such as clutches, springs, and the like, and thereby most important, this integral unit of a system of inclined planes becomes itself a single driven member directly rotated by the eccentric on which it is mounted by means of the anti-friction bearing 23. Further important advantages of this directly driven member of the greatest practical value can now be obtained.

First, both the roller 30 and its coacting inclined plane rotate together, which means, that for any given angular motion of the driving eccentric and any given eccentricity, the inclined plane during the corresponding angular displacement rotates twice the distance that its roller moves forward. This in turn allows of a considerably greater forward movement of the driven member 20 at comparatively small eccentricities, thus increasing the possible range of variation to a point where by proper design of the respective angularity and length of the inclined planes composing the driven member 20, a speed considerably faster than the drive speed of the eccentric can be obtained, the minimum speed, of course, remaining zero at zero eccentricity.

Secondly, and of equal importance from the standpoint of practical application, the angularity between the respective inclined planes 21 and bearing ring 29 constantly changes during the forward rotation of each inclined plane, and this fact, together with the above mentioned double motion, by which an inclined plane is being displaced against a fulcrum (the roller) which itself rotates forward and thereby practically doubles the forward rotation of the plane during the displacement, has a pronounced tendency to materially reduce one feature, which always has been an objection against drives taking variable eccentricity as a basis for variable speed, that, namely, of the fluctuation in speed due to the harmonic motion of the eccentric.

This form of an integral driven member directly rotated by the eccentric without any intervening elements consisting of a system of inclined planes does much more than merely tend to reduce the aforesaid objectionable fluctuation, as it offers the possibility of actually overcoming or eliminating it entirely. It will be seen that the driven member 20 remains free to rotate forward ahead of the eccentric stub shaft 19 on which it is mounted, thus taking on the function of a fly wheel and automatically smoothing out the speed fluctuations by reason of the inertia developed. Furthermore, the curve of each of the inclined planes comprising the driven member 20 can be so designed, that the rate of displacement changes inversely with the rate of speed of the driving force. This point is best seen in Figure 9 of the drawings.

In Figure 9 the full lines indicate the neutral position of a single inclined plane and its roller, as the position of the eccentric shaft 19 is shown at zero eccentricity, or in a position concentric with the drive shaft. This position is the neutral position for all operating parts. For the sake of illustration, it is assumed that the roller 30 when in the neutral position shown in full lines contacts the inclined plane 21 at the center of the curve of that plane, and that the maximum speed occurs at a time when the driving eccentric is in the position shown in dot and dash lines, that is, at the instant when the line of force generated by the eccentric drive strikes the roller in its neutral position on the curve of the plane. This is not actually true, as in reality the maximum speed occurs some fifteen to twenty degrees ahead of the line of force, but the assumption is most convenient for the sake of simplicity in this illustration.

Given the angle A as the angle of repose between the outer ring 29 and the inclined plane 21, the center of the normal curve would be at the point B and the radius for said curve would be C. This normal curve would now cause an even forward rotation for any given displacement effected by an even driving speed, but would of course, also cause an increased speed as the neutral point is being approached and a decreased speed after the neutral point has passed, wherever the driving speed, as is here the case, itself increases and decreases. But, if the radius be shortened as indicated at D as shown in dot and dash lines, the curve assumes the shape here shown in dotted lines E where the angularity toward the neutral point increases, thus causing less displacement and thereby slower speed, and again this angularity decreases, thus causing greater displacement and thereby faster speed after the neutral point has passed.

It is conceded that as the maximum speed occurs at slightly different angles with different eccentricities, such a curve can be geometrically correct only for one given eccentricity, and therefore for all other eccentricities a slight fluctuation still remains at least theoretically, but it can be stated, nevertheless, that with this principle, a curve for the inclined plane may be designed which leaves room only for such an utterly small fluctuation, that for all practical purposes it can safely be neglected as entirely eliminated.

Aside from the fact that the driven member acts as a fly wheel, and further, that the curve of the inclined planes composing this fly wheel driven member can be so adjusted that all fluctuation for all practical purposes is already overcome, a further equalization of even the slight remaining theoretical fluctuation can be effected by the proper design in connection with still another function of the driven member 20 as will be seen hereinafter.

While a smooth, continuous rotation of the driven member is now obtained, the eccentric motion utilized for driving also causes a gyrating movement inwardly and outwardly relative to its center of rotation, as appears from the very nature of the operation.

In operation, as the drive shaft 9 rotates, assuming that the shaft 14 has been adjusted to move the stub shaft 19 to eccentric position, and the direction of rotation is as shown by the arrow in Figure 2 of the drawings, the driven member 20 which is mounted on the eccentric stub shaft 19, is lifted or forced outwardly toward the rollers 30, and the inclined planes 21 contacting with respective rollers are forced to successively roll off forward in their angular displacement, thus rotating the driven member 20. Only one roller operates at a time and during which operation, the other rollers are in idling or released position. It is for this reason that the springs 33 are provided as they serve to contract the instant pressure on the respective rollers is released to force the rollers to remain at all times in contact with both the outer ring 29 and the inclined planes 21. Thus, each inclined plane remains in operating contact with its corresponding roller until maximum angular displacement due to the rise of the eccentric has been reached, at which time the next inclined plane and roller automatically becomes operative. The action is therefore similar to a gear, in that the successive inclined planes corresponding in a way to gear teeth successively engage and release when in operation.

The rotation of the driven member 20 is gyratory but a continuous rotation is imparted therefrom to the driven shaft 34 through the flexible coupling consisting of the coupling plates 25, 36, and 37. The operation of the flexible coupling is somewhat similar to the principle involved in ordinary flexible couplings but with this characteristic difference, that the radial distance of the points where the load is taken on by the driven shaft, remains fixed, the lugs 40 being rigidly mounted on the driven shaft, and furthermore, the load is transferred from the gyrating lugs 41 in the same plane of action, both sets of lugs extending into the same coupling plate 37. It is therefore evident that not only does this coupling plate 37 adjust the gyrating movement produced by the eccentrically driven member 20, but any tendency of one of the lugs 41 to move faster or slower is prevented, since neither of the lugs 40 can move faster or slower than the other, both being fixed in the same common carrier at equal distances from the center, and any difference in speed must therefore be taken up in the coupling plate.

For the purpose of manually controlling the amount of eccentricity of the stub shaft 19, I provide the following. Journaled in the housing 11 is a rotatable stem or shaft 42, the outer end of which carries a hand wheel 43 while the inner end has a gear 44 fixed thereto. Also journaled within the housing and disposed on opposite sides of the socket 12 of the drive shaft is a pair of shafts 45, the upper ends of which carry gears 46, which are in meshing engagement with the gear 44. Worms 47 are provided on the shafts 45 intermediate their ends and which mesh with gears 48 on screw shafts 49, which are journaled within the housing and extend parallel to the axis of the drive shaft. Threaded on the screw shaft 49 are slide blocks 50, which extend into the groove 51 in the collar 15. The slide blocks also extend into tracks or guide channels 52 formed in the inner walls of the housing 11.

For obtaining an adjustment of the driving eccentric shaft 19 the operator turns the hand wheel 43 which imparts rotation to the shafts 45 through meshing gears 44 and 46, from where turning movement is imparted to the screw shafts 49 through worms 47 and gears 48, the rotation of the screw shafts imparting a longitudinal feeding movement to the blocks 50, causing collar 15 to slide longitudinally along the socket end 12 of the drive shaft. This sliding movement causes turning of the eccentric shaft 14 due to the key lug extending into the spiral slot 17 of the shaft 14. This construction permits of a very accurate adjustment of the eccentric form neutral or zero eccentricity upwards.

From the foregoing description, it will be seen that when the stub shaft 19 is in a position, concentric with the drive shaft 9, there can be no rotation of the driven member 20, but as this part is turned out from that center, it becomes the driving eccentric and rotates the driven member in a manner already described, from where the power is transferred to the driven shaft 34 through the flexible coupling. Thus the driven shaft is rotated at an even velocity and constant flow of power at a speed controlled by the amount of eccentricity of the eccentric stub shaft 19.

In the construction of large size transmissions of the kind described the weight of the driven member 20 rotated by the eccentric 19 is greatly increased, and when in addition, a larger eccentricity is used, the centrifugal force generated by its eccentric motion may set up vibrations detrimental to the unit. It is advisable, therefore, in such cases to keep the eccentric 19 and the driven member 20 rotated thereby in balance at all times. One simple way of balancing the driven member is to connect a counter-weight to the driven member in any convenient location. One location is illustrated in Figures 10, 11, and 12, wherein the driven member 20' is formed with an annular recess 53 which opens through one side of the driven member, the open side fitting against a fixed plate or part of a housing 11'.

Disposed within the recess 53 is the counter-weight consisting of two or more eccentric rings slidably mounted one within the other and designated at 54, 55 and 56 respectively. In a concentric or neutral position as shown in Figures 10 and 11, the combined eccentric rings form a large concentric ring placed in the center of the recess 53 in such manner, that a clearance is provided between the surfaces of the recess and the counter-weight ring, corresponding to the maximum eccentricity to be employed, and the weight of the combined rings 54, 55 and 56 corresponds to the weight of the driven member 20, plus the eccentric stub shaft 19 with its roller bearing 23.

The inner eccentric ring 54 is provided with an annular flange on one side which is received in an annular concentric groove 58 provided in the closed side wall of the driven member 20', while the outer eccentric ring 56 is provided with an annular eccentric flange 59 at one side which is received in a groove 60 provided in the plate or casing 11' and which is concentric to the center of rotation.

In operation of the counter-weight construction, as the stub shaft 19 and driven member 20' move into an eccentric position as shown in Figure 12, and the center of mass of the member 20' and stub shaft 19 are moved out of the center of rotation equal to the distance marked X of the eccentricity, the inner eccentric ring 54 by virtue of its flange 57 running in the groove 58, is pressed out in the same direction and tends to take counter-weight along. The flange 59, however, radially fixed in the groove 60 in the casing, offers a resistance, and the individual eccentric rings 54, 55 and 56 are forced to slide off on each other and adjust themselves in the position shown in Figure 12, where their combined weight decreases in the direction of the eccentric movement of the member 20' and correspondingly increases in the opposite direction in the same proportion as the mass of the driven member 20' shifts its weight in the eccentric direction, thus holding the eccentric in balance, whatever the position of the stub shaft 19 and driven member 20' may be.

While the above described method of balancing the driven member 20' is comparatively simple, compact, and inexpensive, the pressure exerted to effect the adjustment of the eccentric rings causes some efficiency loss, even if rollers are interposed between the surfaces of the eccentric rings to reduce friction. Where, therefore, it is desired to balance the eccentric without efficiency losses, the modification shown in Figures 13, 14, and 15 may be used, although a bit more expensive than the construction set forth in the preceding modification.

In this form the construction is similar to that shown in Figures 1 to 6 and similar reference characters refer to like parts. In this form, the end plate 25 fixed to the eccentrically driven member 20 is here provided with an outer angular or beveled surface 61. A counter weight 62 is disposed adjacent the beveled side of the plate and has corresponding angular or beveled segmental shaped members 63 slidably mounted therein, the angular or beveled surfaces of which face toward the beveled surface 61. Radially disposed grooves 64 and 65 are respectively arranged in the beveled surface 61 and segmental shaped members 63 and face each other to provide grooves or pockets for balls 66 which have bearing engagement on the bearing ring 27.

In Figure 14, the parts are shown in eccentric position, wherein the plate 25 fixed to the driven member 20' has been forced out from the center of rotation in one direction and thereby drives a ball 66 along the reaction surface 27 of the casing at right angles to the direction of the eccentric, and the ball in turn has forced the counterweight 62 out of the center of rotation in the opposite direction by an amount corresponding to the outward movement of the center of the mass of the stub shaft 19 plus the driven member 20, thereby holding that mass in balance.

While I have shown and described what I consider to be the general principle of my invention, I wish it to be understood that such changes in construction as come within the scope of the appended claims may be resorted to if desired.

Having thus described the invention, what I claim as new and desire to secure by Letters Patent of the United States, is:

1. In a power transmission, a drive shaft, an eccentric mounted on said drive shaft, a driven member rotated by said eccentric, a reaction member, and rotatable elements co-operating with said driven member and reaction member to cause rotation of said driven member and permit overrunning thereof.

2. In a power transmission, a drive shaft, an eccentric mounted on said drive shaft, a driven member rotated by said eccentric, a reaction member, a driven shaft, rotatable elements co-operating with said driven member and reaction member to cause rotation of said driven member and permit overrunning thereof, and flexible coupling means to impart rotation from the driven member to the driven shaft.

3. In a power transmission, a drive shaft, an eccentric rotatable by said drive shaft, a reaction member, a driven member rotatably mounted on said eccentric embodying a series of angular surfaces, and rotating elements engageable with said angular surfaces and co-operating with said eccentric and said reaction member to impart rotation from said drive shaft to said driven member.

4. In a power transmission, a drive shaft, an eccentric mounted on said drive shaft, a driven member rotated by said eccentric, a reaction member, rotatable elements co-operating with said driven member and reaction member to cause rotation of said driven member and permit overrunning thereof, and means for changing the eccentricity of the said eccentric.

5. In a power transmission, a driving member, a member having unidirectional angular surfaces, rollers engageable with said surfaces, a driven member co-operating with said rollers, and means operated by said driving member and adapted to approach and recede from said rollers to cause said rollers to rotate forwardly along said surfaces.

6. In a power transmission, a drive shaft, a driven shaft, a reaction member, an eccentric mounted on said drive shaft, a flexible coupling directly mounted on said eccentric and operatively connected with said driven shaft, means embodied in said flexible coupling including a series of angular surfaces and a series of rotating elements respectively engaging the angular surfaces and interposed between said angular surfaces and said reaction member for imparting rotation from said drive shaft to said driven shaft.

7. In a power transmission, a drive shaft, a driven shaft, a reaction member, an eccentric mounted on said drive shaft, a flexible coupling directly mounted on said eccentric and operatively connected with said driven shaft, means embodied in said flexible coupling including a series of angular surfaces and a series of rotating elements respectively engaging the angular surfaces and interposed between said angular surfaces and said reaction member for imparting rotation from said drive shaft to said driven shaft, and means for adjusting the eccentricity of said eccentric.

WERNER NOWKA.